United States Patent [19]

Wilson

[11] Patent Number: 4,648,801
[45] Date of Patent: Mar. 10, 1987

[54] WIND TURBINES

[75] Inventor: Robert R. Wilson, Kilmalcolm, Scotland

[73] Assignee: James Howden & Company Limited, Glasgow, Scotland

[21] Appl. No.: 868,190

[22] Filed: May 21, 1986

[30] Foreign Application Priority Data

Sep. 20, 1982 [GB] United Kingdom ............... 8226674

[51] Int. Cl.$^4$ .............................................. F03D 9/02
[52] U.S. Cl. ................................. 416/171; 416/10; 416/175; 415/2 A
[58] Field of Search .................................. 416/10, 175

[56] References Cited

U.S. PATENT DOCUMENTS

| 1,578,923 | 3/1926 | Schlotter | 415/4 A X |
|---|---|---|---|
| 2,017,961 | 10/1935 | Ferral | 415/4 A X |
| 2,652,699 | 9/1953 | Romani | 417/336 X |
| 4,008,006 | 2/1977 | Bea | 417/336 X |
| 4,075,500 | 2/1978 | Oman et al. | 415/3 A X |
| 4,087,196 | 5/1978 | Kronmiller | 415/3 A X |
| 4,141,215 | 2/1979 | Cadalzo | 416/171 X |
| 4,143,522 | 3/1979 | Hamrick et al. | 416/171 X |
| 4,204,799 | 5/1980 | de Geus | 415/4 A X |
| 4,324,985 | 4/1982 | Oman | 415/4 A X |
| 4,358,250 | 11/1982 | Payne | 60/398 X |
| 4,370,095 | 1/1983 | Sleeper | 416/171 X |
| 4,385,871 | 5/1983 | Beisel | 417/334 |
| 4,390,148 | 6/1983 | Cudmore | 416/175 A X |
| 4,422,820 | 12/1983 | Kirsch et al. | 415/4 A |
| 4,447,738 | 5/1984 | Allison | 60/398 X |

FOREIGN PATENT DOCUMENTS

| 500360 | 1/1951 | Belgium | 416/171 |
|---|---|---|---|
| 33383 | 6/1924 | Denmark | 415/DIG. 1 A |
| 739482 | 9/1943 | Fed. Rep. of Germany | 416/175 A |
| 836930 | 4/1952 | Fed. Rep. of Germany | 416/11 |
| 860029 | 12/1952 | Fed. Rep. of Germany | 416/11 |
| 2900797 | 7/1979 | Fed. Rep. of Germany | 416/177 |
| 491535 | 12/1919 | France | 417/336 |
| 1258114 | 2/1961 | France | 416/171 |
| 213022 | 3/1924 | United Kingdom | 416/11 |
| 225815 | 2/1925 | United Kingdom | 416/11 |
| 2067247 | 7/1981 | United Kingdom | 416/10 |
| 540056 | 12/1976 | U.S.S.R. | 416/175 A |

Primary Examiner—Everette A. Powell, Jr.
Attorney, Agent, or Firm—Barnes & Thornburg

[57] ABSTRACT

A wind turbine assembly includes a wind turbine 18 mounted in a head 16, the wind turbine driving, via a gear box 22, an air compressor 24, 25, the inlet 26 of which is arranged to withdraw air from the vicinity of the blades of the turbine 18 to improve the efficiency of the turbine. The compressed air may be fed via a duct 12 for example to a reservoir or to a motor or gas turbine, for example, to drive a generator.

5 Claims, 3 Drawing Figures

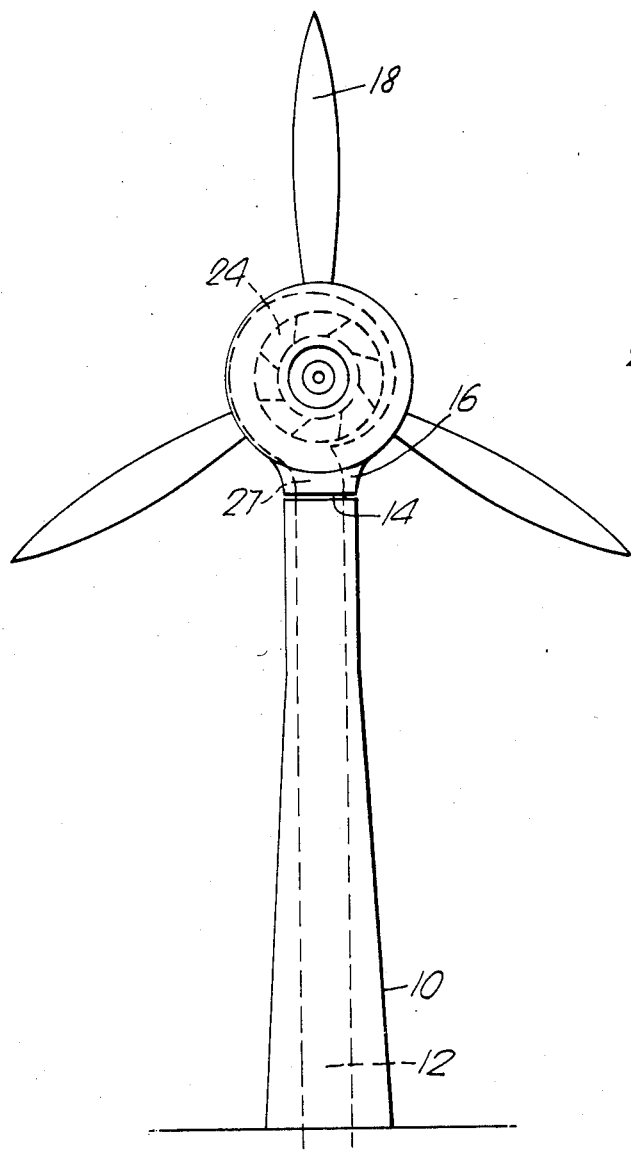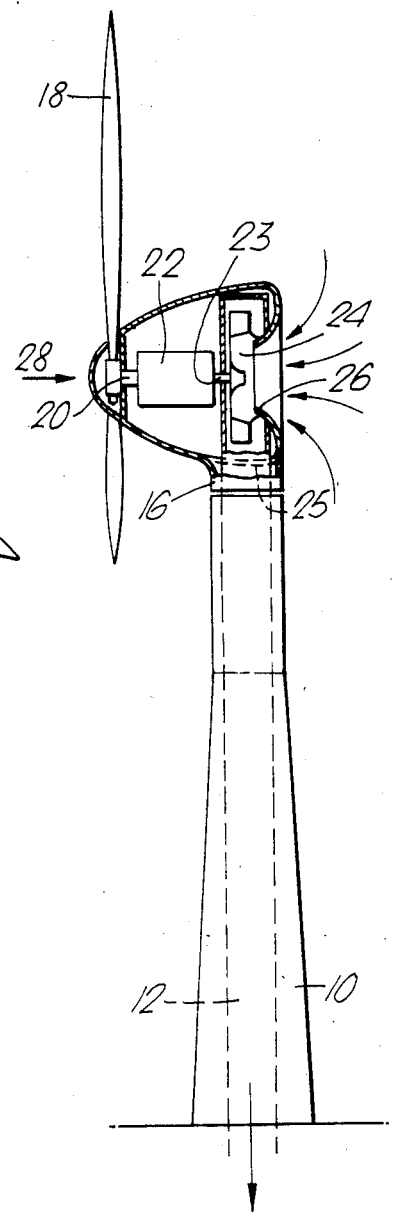

WIND TURBINES

DESCRIPTION

The present invention relates to wind turbines and to arrangements employing wind turbines.

Wind turbines or windmills usually apply the wind power directly to the particular task for which they are intended.

Traditionally windmills were used for grinding corn and the drive from the windmill is taken via a suitable gearing to the grinding stones. Wind turbines have also been used for many years, again by a suitable gearing, to drive water pumps and also to drive electrical generators. However, there are a number of problems in this. The gearing can be quite complex and therefore inefficient and the windmill needs to be operable only at sufficiently high speed to drive the generator to produce the electricity.

In order to overcome these difficulties proposals have been made to provide a hydraulic drive between the output of the windmill and the hydraulic motor with or without the interposition of an accumulator, the motor itself driving the generator. While this produces some advantages over the prior art, the results are still not entirely satisfactory.

It is now proposed, according to the present invention, to provide a wind turbine assembly comprising a wind turbine, an air compressor operatively connected to the turbine to be driven thereby, the inlet to the air compressor being positioned to remove air from the wind turbine blades and a reservoir to receive air under pressure from the compressor or a motor to be driven by air pressure produced by the compressor.

Such a construction has a number of advantages. In any form of wind turbine, particularly of the axial flow type, there is a build up of air downstream of the blades of the wind turbine and there is nowhere for this build up to dissipate itself without using up some of the energy available in the wind. Theoretical calculations have shown that the maximum possible efficiency of a wind turbine is of the order of 59%. That is to say the wind turbine is capable of extracting 59% of the energy available in the wind.

With the assembly of the present invention, because air is withdrawn from the blades of the turbine, there is a removal of this air build up so that the efficiency of the turbine can be significantly increased.

The air can be removed immediately downstream of the blades of the turbine, or immediately upstream thereof. It is contemplated, also, that the air can be removed through apertures or perforations in the turbine blades themselves.

It is contemplated that all or only part of the power from the turbine can be used to drive the compressor.

In a presently preferred construction, the inlet to the compressor is located downstream of the turbine itself, the inlet in fact pointing in the downstream direction. In this way the mounting for the turbine can also be the mounting for the compressor, so that the compressor can be caused to swivel with the turbine to take up the angle of incidence of the wind. Thus, the turbine is preferably mounted on a tower assembly having a vertical duct therein, the vertical duct being connected to the outlet to the compressor. The duct can have a simple pipe swivel joint at its top to allow the turbine and the compressor to rotate to take up the wind direction.

While the air compressor may take any form, it is preferably a fan, for example of the centrifugal type. The direction of rotation of the fan is preferably opposite to the direction of rotation of the wind turbine rotor and this may be achieved by gearing which preferably also increases the speed of the fan significantly relative to the speed of the wind turbine rotor. It will be appreciated that the air downstream of the wind turbine rotor will have not only an axial component of movement, but also a rotational or swirl component. If the direction of rotation of the compressor fan is chosen to be opposite to that of the rotor, then the swirl energy can, at least in part, be recovered or, more correctly used by the compressor.

Downstream of the compressor the air can be fed directly to a pneumatic motor or can be fed via at least one accumulator or reservoir. The latter will help smooth out any pulsations due to variation in wind speed. The compressed air could be fed to a series of reservoirs, the pressures in at least some of the separate reservoirs being different.

It is also contemplated that the compressed air produced by the compressor can be fed to a large reservoir, via a suitable valving system, and this reservoir can subsequently be used to discharge, together with a fuel, into a gas turbine. The efficiency of operation of the gas turbine will be greatly increased if a large supply of compressed air is available, because the gas turbine will then not need to have its own compressor absorbing a significant portion of the energy available from the gas turbine. Such a system could be used to provide continuous power availability and/or a facility for peak lopping.

It will be appreciated that the speed/torque characteristics of the compressor fan can be matched to those of the rotor so that variable speed operation can be made possible In order that the present invention may more readily be understood, the following description is given, merely by way of example, reference being made to the accompanying drawings, in which:

FIG. 1 is a rear elevation of one embodiment of wind turbine assembly according to the invention;

FIG. 2 is a side elevation of the assembly of FIG. 1; and

Figure 3:
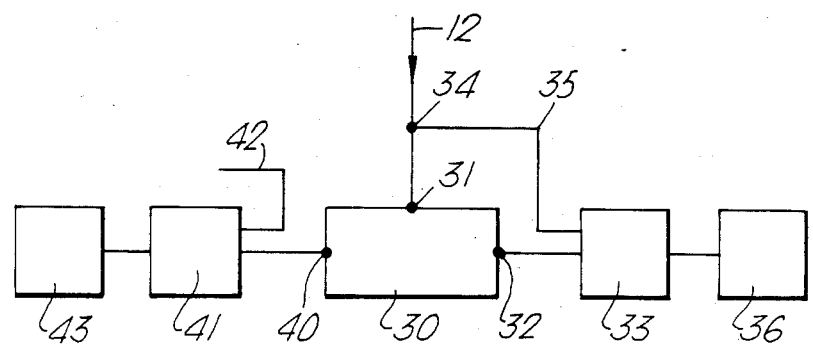
FIG. 3 is a block diagram illustrating how the air under pressure for the air compressor may be used.

Referring to the drawing, there is illustrated a tower 10 having a central duct 12 extending upwardly therewithin, and terminating in a rotary joint 14. Mounted on top of the tower is a rotatable head 16 in which is located the joint 14, the head 16 carrying a conventional axial flow wind turbine rotor 18. Mounted on the shaft 20 of the rotor 18 is a speed increasing gearbox 22, the output shaft 23 of which is connected to the fan or impeller 24 of a centrifugal compressor 25 included within the head 16.

The inlet 26 of the centrifugal compressor 25 is coaxial with the fan and faces the downstream direction of wind which is shown moving in the direction of the arrow 28 in FIG. 2.

In operation, wind moving in the direction of the arrow 28 will cause the wind turbine to rotate and this in turn will cause the fan 24 of the compressor 25 to rotate at a rather higher speed. The direction of rotation is the opposite to that of the impeller 18.

As a result of drawing air from behind the impeller 18 into the compressor 25, the build up of air behind the impeller 18 is significantly reduced and this produces an increase in the efficiency of the impeller 18. The resulting compressed air is fed down from the outlet 27 of the compressor 25 via the rotary joint 14 and the duct 12 to a reservoir 30, as shown in FIG. 3, where the air is fed via valves 34 and 31. From the reservoir compressed air can be fed to drive a pneumatic motor 33. Alternatively, the air can be fed direct to the motor through valve 34 and pipe 35. The motor 33 can be used to drive a generator 36. FIG. 3 shows another possibility in which the air from the reservoir 30 flows through valve 40 to provide a source of compressed air for a gas turbine 41, the gas of which can flow in via line 42. The gas turbine 41 could be used, for example, to drive an electric generator 43.

FIG. 3 shows several different possibilities of using the air under pressure from the air compressor 25, but normally one would only be using one of these possibilities.

I claim:

1. A wind turbine assembly comprising a tower, a head mounted on the upper end of said tower for swivelling about a vertical axis, a duct extending upwardly within said tower, and having an upper end and a lower end, a swivel joint between said head and the upper end of said duct, a wind turbine mounted on said head and having blades thereon, an air compressor mounted in said head, with the axis of the wind turbine and compressor being substantially horizontal, means operatively connecting the air compressor to the turbine, whereby the compressor is driven thereby, an air inlet and an air outlet of said compressor, said air inlet being positioned downstream and sufficiently close to said blades and of a size effective to remove a substantial quantity of air from the axial flow airstream in the vicinity of said blades of said wind turbine thereby significantly to improve the efficiency of said turbine, the outlet of the compressor being connected to said swivel joint, whereby air under pressure from said air compressor can be fed down said duct to the lower end thereof and a reservoir connected to said lower end of the duct, effective to receive air under pressure from said compressor, said head being allowed to swivel, so that the wind turbine can face the wind.

2. An assembly as claimed in claim 1, wherein said air inlet is positioned on the downstream side of said wind turbine blades.

3. An assembly as claimed in claim 1, wherein said air compressor is mounted coaxially with said wind turbine.

4. An assembly as claimed in claim 3, wherein said air compressor is a centrifugal compressor and wherein the means operatively connecting the wind turbine to the blades cause said compressor to rotate in the opposite rotational sense to said wind turbine.

5. An assembly as claimed in claim 4, wherein said means comprise a gear box having a drive ratio whereby said air compressor is driven at a greater rotational speed than said wind turbine.

* * * * *